United States Patent
Alaimo et al.

[15] 3,696,114
[45] Oct. 3, 1972

[54] ANTIFUNGAL THIOCYANATOBENZOTHIAZOLES

[72] Inventors: Robert J. Alaimo; Stanford S. Pelosi, Jr., both of Norwich, N.Y.

[73] Assignee: Morton-Norwich Products, Inc.

[22] Filed: Oct. 22, 1970

[21] Appl. No.: 83,220

[52] U.S. Cl. .................................260/305, 424/270
[51] Int. Cl. .............................................C07d 91/46
[58] Field of Search.......................................260/305

[56] References Cited

OTHER PUBLICATIONS

Fishwick et al., Chem. Abstracts, 55:14925f (1961).
Likhosherstov et al., Chem. Abstracts, 28:2690–2691 (1934).
Elderfield, Heterocyclic Compounds, Vol. 5, pp. 585–586, N.Y., Wiley, 1957.

*Primary Examiner*—Alex Mazel
*Assistant Examiner*—R. J. Gallagher
*Attorney*—Bradford S. Allen

[57] ABSTRACT

Certain thiocyanatobenzothiazoles of the formula:

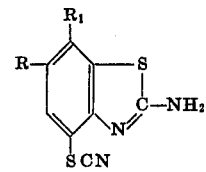

wherein R is chloro, fluoro or methylthio; and $R_1$ is hydrogen or chloro are antifungal agents.

4 Claims, No Drawings

ANTIFUNGAL THIOCYANATOBENZOTHIAZOLES

This invention relates to chemical compounds. More particularly it relates to thiocyanatobenzothiazoles of the formula:

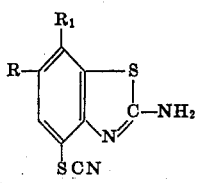

wherein R is chloro, fluoro or methylthio; and $R_1$ is hydrogen or chloro and to a method for preparing them.

These compounds possess antifungal activity and are useful in the prevention of fungal growth. When dissolved in 50 percent ethanol at a concentration of from 200–250 mcg. per ml., they inhibit the growth of *Candida albicans* and *Microsporum canis* in the commonly employed agar cup plate test for fungistatic activity. In similar concentration in dimethylformamide they inhibit the growth of *Aspergillus niger* in nutrient agar seeded therewith. These compounds are useful antifungal agents and can be combined in known fashion with various compatible excipients and adjuvants to provide antifungal compositions.

The compounds of this invention are readily prepared. Currently the method for their preparation consists in reacting the appropriate aniline with sodium thiocyanate in the presence of bromine dissolved in sodium bromide saturated methanol.

In order that this invention may be readily available to and understood by those skilled in the art these examples are appended:

EXAMPLE I

2-Amino-7-chloro-6-fluoro-4-thiocyanatobenzothiazole

A cold solution of 36 ml. (0.60 mole) of bromine in 240 ml. of absolute methanol saturated with NaBr was added dropwise to a mixture of 97 g. (0.12 mole) of sodium thiocyanate and 480 ml. of methanol at −20° to −10°. 3-Chloro-4-fluoroaniline (34 g., 0.23 mole) was added dropwise to the mixture at −15°, and the Dry Ice-acetone bath was removed. The mixture was stirred at room temperature overnight, and the solid was removed by filtration. The filtrate was poured into an equal volume of cold water and made basic with NH$_4$OH. The solid was collected by filtration and subjected to fractional recrystallization from ethanol. The first seven crops were combined and recrystallized three times from CH$_3$NO$_2$ to give 2.6 g., (4 percent); m.p. 196°–199°.

Anal. Calcd. for $C_8H_3ClFN_3S_2$: C, 36.99; H, 1.16; N, 16.18.

Found: C, 36.65; H, 1.37; N, 15.76.

EXAMPLE II

2-Amino-6-methylthio-4-thiocyanatobenzothiazole

A mixture of sodium thiocyanate (122 g., 1.5 mole) in anhydrous methanol (500 ml) was chilled to −7° in a Dry Ice-acetone bath. To the stirred mixture was added dropwise a chilled solution of bromine (200 g., 0.75 mole) in sodium bromide saturated methanol (100 ml.). The temperature was maintained between −7° and −10° throughout the addition. After the addition was complete, 4-methylthioaniline (42 g., 0.3 mole) was poured into the mixture and the stirring was continued at room temperature for 4 hours.

The reaction mixture was filtered and the solid product was suspended in water and neutralized with ammonia. The product was removed by filtration, and air dried to yield 35 g. (46 percent) of yellow product. Recrystallization from methanol/dimethylformamide provided crystals which melted at 205°–207°.

Anal. Calcd. for $C_9H_7N_3S_3$: C, 42.66; H, 2.78; N, 16.59.

Found: C, 42.40; H, 2.71; N, 16.25.

EXAMPLE III

2-Amino-6-chloro-4-thiocyanatobenzothiazole

A mixture of sodium thiocyanate (200 g., 2.5 moles) in anhydrous methanol (1200 ml.) was chilled to −7° in a Dry Ice-acetone bath. To the stirred mixture was added dropwise a chilled solution of bromine (200 g., 1.25 moles) in sodium bromide saturated methanol (300 ml.). The temperature was maintained between −7° and −10° throughout the addition. After the addition was complete, p-chloroaniline (65 g., 0.5 mole) was poured into the mixture and stirring continued at room temperature overnight.

The reaction mixture was filtered and the solution poured into water (3.1) and made basic with NH$_4$OH to precipitate the product. The product was removed by filtration, washed with water and ethanol and air dried. The tan solid (90 g., 74 percent) was recrystallized from dimethylformamide/H$_2$O (Darco) to provide crystals which melted at 205°–207°.

Anal. Calcd. for $C_8H_4ClN_3S_2$: C, 39.75; H, 1.67; N, 17.37.

Found: C, 39.63; H, 1.97; N, 17.13.

EXAMPLE IV

2-Amino-6,7-dichloro-4-thiocyanatobenzothiazole

To 800 ml. of methanol was added sodium thiocyanate (162 g. 2.0 moles). The mixture was stirred below −15° in a Dry-Ice-acetone bath. To it was added a cooled solution of bromine (60 ml., 1.0 mole) in sodium bromide saturated methanol (400 ml.) over 5 to 10 minutes maintaining temperature below −10° and shielding from light. After all is added, 65 g. (0.4 mole) of 3,4-dichloroaniline was added stirring rapidly below −10° to −15° and allowing to slowly come to room temperature, then stirring slowly for 5 to 6 hours. After total stirring of 6 to 7 hours, the mixture was filtered and the solid suspended in water, stirred and made basic with NH$_4$OH. The solid was filtered, washed with H$_2$O, air-dried, then put in about 1 liter of alcohol and boiled under stirring and filtered into a warm flask. Crystallization took place on cooling; yielding 22 g. Recrystallization from alcohol yielded a white crystalline solid which melted at 243° to 245°.

Anal. Calcd. for $C_8H_3Cl_2N_3S_2$: C, 34.79; H, 1.10; N, 15.21.

Found: C, 34.61; H, 1.05; N, 15.02

What is claimed is:

1. A compound of the formula:

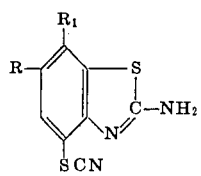
wherein R is chloro, fluoro or methylthio; and $R_1$ is hydrogen or chloro with the proviso that when R is chloro, $R_1$ is not hydrogen.
2. The compound of claim 1 wherein R is chloro and $R_1$ is chloro.
3. The compound of claim 1 wherein R is fluoro and $R_1$ is chloro.
4. The compound of claim 1 wherein R is methylthio and $R_1$ is hydrogen.
* * * * *